(12) United States Patent
Napp et al.

(10) Patent No.: US 10,786,846 B2
(45) Date of Patent: Sep. 29, 2020

(54) MANUFACTURING OF A BEARING

(71) Applicant: Airbus Operations GmbH, Hamburg (DE)

(72) Inventors: Christian Napp, Hamburg (DE); Thorsten Michael Wienberg, Hamburg (DE)

(73) Assignee: Airbus Operations GmbH (DE)

( * ) Notice: Subject to any disclaimer, the term of this patent is extended or adjusted under 35 U.S.C. 154(b) by 179 days.

(21) Appl. No.: 15/797,080

(22) Filed: Oct. 30, 2017

(65) Prior Publication Data

US 2018/0117662 A1 May 3, 2018

(30) Foreign Application Priority Data

Nov. 2, 2016 (DE) .................. 10 2016 120 862

(51) Int. Cl.
| | |
|---|---|
| B21D 53/10 | (2006.01) |
| F16C 23/04 | (2006.01) |
| F16C 43/02 | (2006.01) |
| F16C 33/14 | (2006.01) |
| B23P 15/00 | (2006.01) |
| F16C 17/03 | (2006.01) |

(52) U.S. Cl.
CPC ............ *B21D 53/10* (2013.01); *B23P 15/003* (2013.01); *F16C 17/03* (2013.01); *F16C 23/045* (2013.01); *F16C 33/14* (2013.01); *F16C 43/02* (2013.01)

(58) Field of Classification Search
CPC ........ B21D 53/10; F16C 33/14; F16C 23/045; F16C 43/02; F16C 17/03; B23P 15/003
See application file for complete search history.

(56) References Cited

U.S. PATENT DOCUMENTS

| | | | |
|---|---|---|---|
| 3,848,938 | A | 11/1974 | Stella et al. |
| 9,989,086 | B2 | 6/2018 | Buettner |
| 2008/0107365 | A1 | 5/2008 | Mueller |
| 2009/0290822 | A1 | 11/2009 | Wilson et al. |

FOREIGN PATENT DOCUMENTS

| | | |
|---|---|---|
| DE | 2408740 A1 | 9/1974 |
| DE | 10 2006 044 637 A1 | 3/2008 |
| DE | 10 2007 008 584 B3 | 11/2008 |
| DE | 10 2011 079 155 A1 | 1/2013 |
| DE | 10 2015 211 739 A1 | 12/2016 |
| EP | 1 921 332 A2 | 5/2008 |
| GB | 2 426 795 A | 12/2006 |

*Primary Examiner* — Moshe Wilensky

(74) *Attorney, Agent, or Firm* — Lerner, David, Littenberg, Krumholz & Mentlik, LLP

(57) ABSTRACT

A method for manufacturing a bearing includes the following steps: a) providing of an outer part with a concave running surface which forms a receiving area for receiving an inner part, b), providing an inner part that is arranged inside the outer part, which inner part is shaped annularly, c) arranging the inner part within the outer part in a machining position in which at least a part of an outer surface of the inner part is exposed for machining, and d), generating of a convex running surface of the inner part, which running surface engages with the receiving area of the outer part whereby the inner part is held captively in the outer part. Subsequently, the inner part may be tilted from the machining position into a running position in which the inner part is concentric with the outer part.

10 Claims, 3 Drawing Sheets

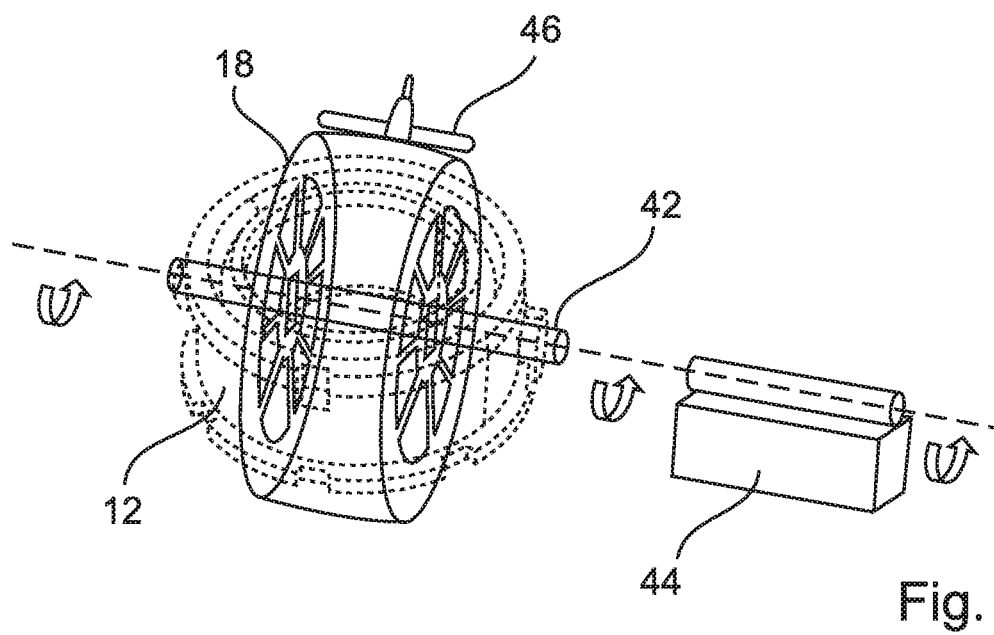
Fig. 5
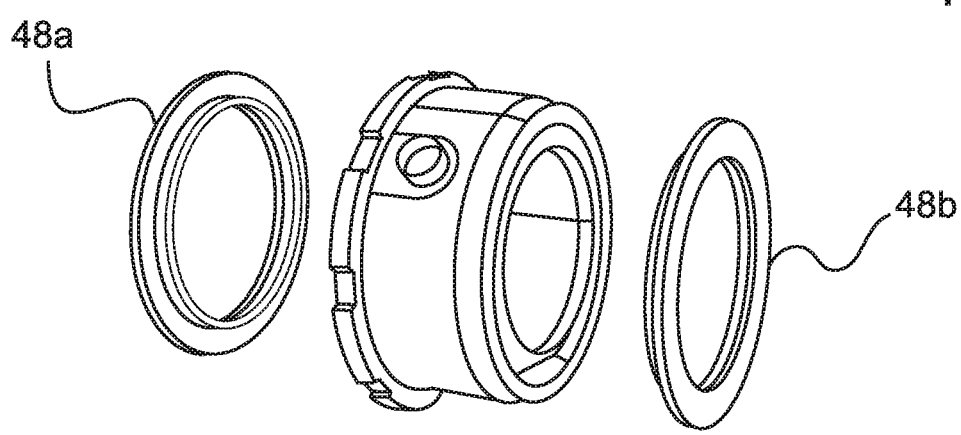
Fig. 6
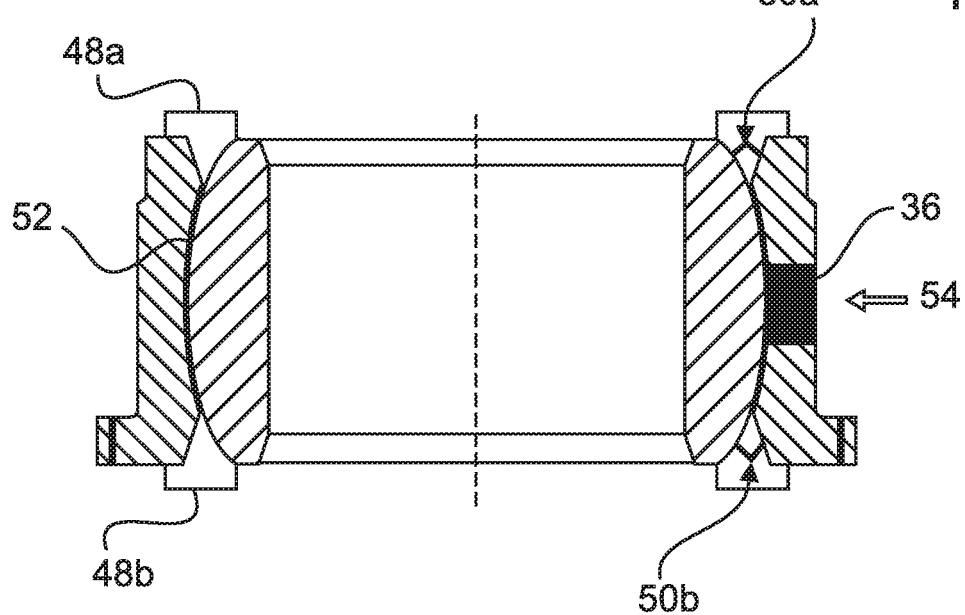

MANUFACTURING OF A BEARING

FIELD OF THE INVENTION

The present description relates to a method for manufacturing of bearings, an arrangement for manufacturing of a bearing and a bearing manufactured with that method.

BACKGROUND OF THE INVENTION

Bearings provide, for example, relative movements of different construction components in desired degrees of freedom. Bearings may be distinguished by their operating principle. For example, in rolling bearings, the transmission of the bearing forces of the parts which are moved relative to one another takes place via intermediate elements, e.g., rolling elements, while in plain bearings, the moving parts are in direct contact with each other, i.e., the transmission of the bearing forces takes place substantially via direct contact (apart from lubricants, such as greases or oils). For plain bearings that are used for rotating components there exist embodiments in which an inner part of the bearing is held captively or undetachable in an outer part of the bearing, for example. In order to keep an inner part captive in an outer part, the outer part may be produced in multiple pieces and may be assembled such that it surrounds or encompasses the inner part, or vice versa, by assembling the inner part. However, it has been recognized that a manufacturing of the outer part in several pieces is complex; in addition, the surface quality is of particular importance in heavily loaded bearings. Integrating one-piece or monobloc bearing parts into one another is also only possible to a very limited extent.

BRIEF SUMMARY OF THE INVENTION

An aspect of the invention may provide a possibility of manufacturing a bearing of this type more quickly and at lower cost with high quality.

According to a first aspect, a method for manufacturing a bearing is provided including the following steps. In a first step a), an outer part with a concave running surface is provided which concave running surface forms a receiving area for receiving an inner part. Furthermore, b), an inner part, which is arranged within the outer part, is provided, which is designed ring-shaped or annularly. The inner part is arranged, c), within the outer part in a machining or processing position B, in which at least a part of an outer surface of the inner part is exposed for machining. Thereupon, d), a convex running surface of the inner part is generated, which engages into the receiving area of the outer part, whereby the inner part is held captively in the outer part. The inner part can be tilted from the machining position B into a running position L, wherein the inner part is arranged concentrically with the outer part.

The term "concentric" means that the convex running surface and the concave running surface are arranged such that they are assigned or allocated to each other.

The term "concave" running surface means that the running surface forms a receiving area inwardly in the cross-section of the bearing, or forms a kind of arched deepening in the cross-section. The inwardly directed running surface of the outer part may also be referred to as an outer running surface or as an inwardly directed outer running surface.

The term "convex" running surface means that the running surface is arched outwardly with respect to the inner part, or forms a kind of arched projection in the cross-section. The running surface of the inner part, which running surface is directed outwardly, may also be referred to as an inner running surface or as an outwardly directed inner running surface.

The running surfaces are circumferentially shaped as a ring, i.e., designed in a ring-shaped manner, e.g., to provide a rotatable bearing. In its cross-section, i.e., in a radial viewing direction, the outer running surface is formed concave. In the cross-section, the outer running surface forms a space for accommodating the inner running surface that is adapted as a counterpart. In the cross-section, i.e., in a radial viewing direction, the inner running surface is shaped convex.

In the cross-section, the inner running surface forms a kind of a protrusion which protrudes into the receiving space of the outer running surface that is adapted as a counterpart.

In other words, the annular design of the outer part forms a second concave shape of the outer running surface, i.e., one in the transverse direction, i.e., transversely with respect to the axis of rotation of the bearing, and one in the longitudinal direction, i.e., in the direction of rotation of the bearing. In an analogue manner thereto, the annular design of the inner part forms a second convex shape of the inner running surface, i.e., one in the transverse direction and one in the longitudinal direction.

In an example, the running surfaces are spherical, i.e., the running surfaces each have a two-fold curved contour, and each forms a section of a ball-shaped surface.

The term "held captively" refers to a component that is held trapped or captured, i.e., a component which cannot be removed without further measures.

The bearing is adapted to support a first component at a second component in a movable manner. For example, the bearing is adapted for at least one of the bearing types from the group of plain bearings, rotary bearings and pivoting bearings.

The torsion flexibility of the bearing around a longitudinal axis results from the annular design of the bearing surfaces and/or running surfaces. The pivotability of the bearing (at least to a certain extent) with respect to the longitudinal axis results from the spherical adaption of the bearing surfaces and/or running surfaces.

The outer part is formed, for example, as a bearing component for attachment to a supporting structure. The outer part may also be a region or a part of a further structure, e.g., a projection of a supporting structure for mounting of a drive element or of an adjusting element.

The term "receiving area" describes a volume which is circumscribed by the circumferential concave surface.

The term "within" means that the inner part is at least partially arranged in the receiving area or projects into the receiving area.

In this context, the term "engage" means intruding or extending into. The term "engage" may refer to non-contact intruding.

The term "machining position" refers to a position of the bearing parts in which the running surfaces are pivoted relative to one another such that a region of the outer surface of the inner part is exposed for machining, i.e., is accessible with tools or machines. In this case, a region of the outer surface is enclosed by the outer part, so that this part is not accessible. However, since the inner part is held movably, it can be rotated in order to be able to gradually process all areas of the outer surface of the inner part.

The machining position B is the position at which the exposed outer surface is accessible for machining or processing.

In the machining position, the inner part is rotationally driven (moved) such that the entire outer surface can be processed successively, e.g., the inner member is rotatably supported and driven by rollers.

According to an example, it is provided to tilt the inner part into the running position L, in which the inner part is arranged concentrically with the outer part.

The term "running position" refers to a position of the bearing parts, in which the running surfaces are assigned to each other such that a bearing force transmission is possible between the two parts, and at the same time a movability is given. On the one hand, the term "running position" refers to a so-called ideal position of the two bearing parts with respect to each other, i.e., to a position at which the ideal or best bearing is provided. On the other hand, the term "running position", however, also refers to a range of positions which includes deviating positions, which are, however, also provided and planned as bearing positions. The term "running position" thus refers to a range or scope of bearing positions. The running position may also be referred to as the mounting position or bearing function position.

According to a further example, the outer part and the inner part are produced in a generative manner (layer-wise), e.g., by rapid prototyping; in this case, a convex outer surface of the inner part engages at least partially into the concave receiving area of the outer part. Thus, the inner part is held captive.

For example, the manufacturing of the outer part with the inner part occurs at the same time.

For example, the term "at the same time" refers to a layer-like building of the inner part and of the outer part, wherein the layers of the inner part and of the outer part are applied or built at the same time, i.e., in one step.

The term "generative" refers to the use of a (generative) manufacturing process or method which generates the component, i.e., a manufacturing method in which the material for the component is generated from a basic mass, for example from a liquid or a bulk of solid material, e.g., powder. Generative manufacturing processes are, for example, rapid prototyping, rapid manufacturing or rapid production.

In an example, the inner part is fabricated concentric with the outer part, i.e., in the running position, wherein the inner part is tilted into the machining position B before step c).

In an example, the inner part is fabricated in a tilted position with respect to the outer part and within the outer part, e.g., directly in the machining position.

According to a further example, the outer part comprises at least one throughway opening in the concave running surface, and the inner part comprises an axial receiving opening. In step d), the at least one throughway opening and the receiving opening are aligned and an auxiliary tool is inserted into the receiving opening through the throughway opening, such that the inner part is held rotatably in the machining position. In step d), the inner part is moved, e.g., rotating, by the auxiliary tool.

In an example, the receiving opening is designed as a bearing seat in order to receive a component to be supported in a bearing manner.

The auxiliary tool may also be referred to as an auxiliary axis.

In an example, the outer part comprises two diametrical openings, at least one of which is designed as a throughway opening. The auxiliary axis is thereby guided through an opening and inserted through the inner part and supported on the other side in the second opening. The auxiliary axis represents the axis of rotation of the inner part.

In one example, only one throughway opening is provided, which is inserted into the inner part, so that the load transfer to the outer part takes place only on one side during manufacturing.

According to a further example, the inner part is driven by an external motor unit for finishing or post-processing of the outer surface.

The drive may take place, e.g., via the auxiliary axis, and alternatively or additionally also via rollers, a treadmill, or wheels, etc. (i.e., moving components which, for example, temporarily act on the running surface).

For the finishing or post-processing of the outer surface of the inner part, the auxiliary axis is manually driven in one example.

According to a further example, the finishing of the convex running surface of the inner part comprises a material removal or material abrasion.

A material removal may include grinding, honing, lapping or similar machining operations.

According to a further example, the finishing of the convex running surface of the inner part comprises applying material.

A material application may comprise coating, sputtering, chemical vapor deposition, physical coating methods, curing, nitriding or similar processing.

According to an example, two centering rings are inserted into a tapering gap between the outer part and the inner part in order to keep the inner part and the outer part movable and free of play and to close off a gap between the inner part and the outer ring at the end face.

The gap is, for example, accessible via the at least one throughway opening.

According to an example, the gap between the inner part and the outer ring is filled with a friction-reducing bearing means after the positioning of the centering rings.

As a friction-reducing bearing agent, a PTFE liner, a grease, an oil, or a lubricant, e.g., graphite, may be used.

In an example, a PTFE mass is injected through the throughway opening, which mass subsequently hardens and forms a PTFE lining of the gap. The liner may be referred to as a stock liner or bearing chuck.

Depending on the kind of the friction-reducing bearing means, the throughway opening may be closed with an openable or permanent closure.

According to a further example, the friction-reducing bearing means forms a dimensionally stable running surface. After forming the dimensionally stable running surface, the centering rings are removed again. In this case, the centering rings fulfill the task of closing the gap and prevent the friction-reducing bearing means from escaping over the period of the formation of the dimensionally stable running surface.

In another example, the centering rings may remain mounted, e.g., when forming a running surface which is to be prevented from escaping laterally.

According to another aspect, a bearing is also provided. The bearing has a one-piece outer part with a concave running surface which forms a receiving area for receiving an inner part. Furthermore, it comprises a one-piece inner part with a finished or post-processed convex running surface, wherein the inner part is shaped annularly and is retained or held captively in the outer part.

The term "finished" running surface means a running surface which has been undergone to further processing or post-processing after the one-piece inner part has been made, e.g., polished, smoothed, hardened or compacted, or has been supplemented with a subsequent material application.

In an example, the bearing is produced or manufactured in accordance with an example of the preceding method examples.

In a further example, the outer part comprises at least one throughway opening in the concave running surface.

According to another aspect, an arrangement for manufacturing a bearing is also provided. The arrangement comprises a bearing with an outer part made of one piece (monobloc) with a concave running surface which forms a receiving area for receiving an inner part. Furthermore, the bearing comprises an inner part made of one piece with a finished convex running surface, wherein the inner part is shaped in an annular manner and is held captively in the outer part. The outer part comprises at least one throughway opening in the concave running surface. Furthermore, an auxiliary tool is provided; the auxiliary tool is mountable in the receiving opening of the inner part of the bearing. The auxiliary tool is preferably connectable to an auxiliary insert, and the convex running surface of the inner part of the bearing can be machined in a machining position B.

According to an aspect, it is provided to use the advantages of an additive production process and to increase the surface quality of the convex running surface by further processing steps. For this purpose, the inner part of the bearing is held captively in the outer part, but is rotated or tilted into a machining position such that the convex running surface of the inner part is free. As a result, the convex running surface can be finished and the required surface quality can be achieved. For better workability, the inner part can be supported in the machining position on the outer part with an auxiliary device. The auxiliary device serves, so to speak, as an adapter, and is guided through a throughway opening of the outer part. After machining, the tool is removed and the inner part is tilted into the actual running position. By, for example, the application of two centering rings, the bearing is closed on the end face, and the gap can optionally be filled with a friction-reducing bearing means. A dimensionally stable running surface can thus be formed with the friction-reducing bearing means. The centering rings can thereby be removed after formation of the dimensionally stable running surface.

These and other aspects will become apparent by reference to the following explanations.

BRIEF DESCRIPTION OF THE DRAWINGS

In the following, exemplary embodiments will be described with reference to the attached drawings. It is shown in:

FIG. 5 an example of a processing of the convex running surface of the inner part by material removal; and FIG. 6. an example of an insertion of the centering rings and injection of a bearing means.

DETAILED DESCRIPTION

Figure 1:
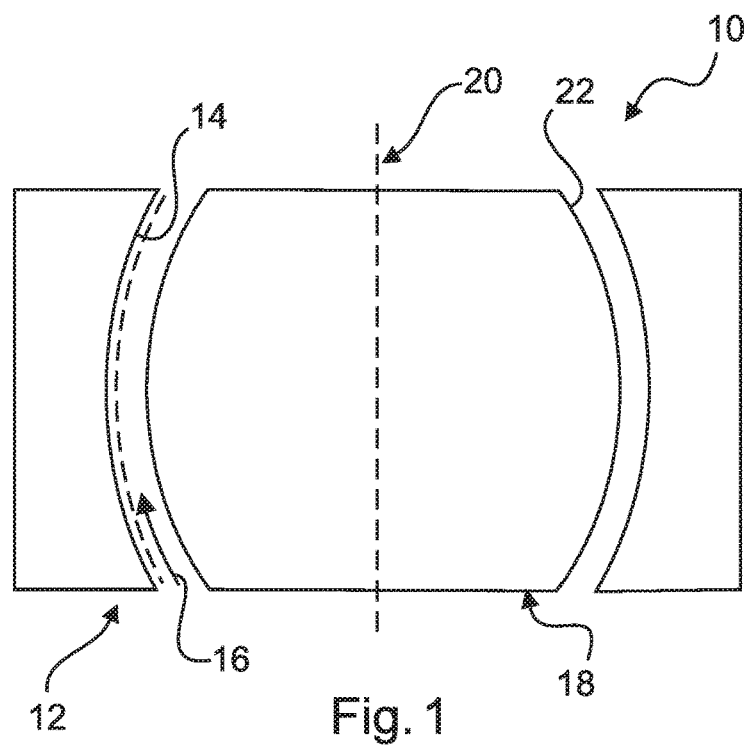
FIG. 1 a cross section through a bearing.

FIG. 1 shows a cross-section through a bearing 10. The bearing 10 has an outer part 12 with a concave running surface 14 and a receiving area 16 for receiving an inner part 18. As a result, the inner part 18 is held captively in the outer part. In relation to the outer part 12, the inner part 18 is arranged movably about a rotational axis 20. Furthermore, the inner part 18 comprises an outer surface, which is formed as a convex running surface 22. If the central axes of the inner part 18 and the outer part 12 are both located on the axis of rotation 20, the bearing is located in an (ideal) running position L. According to an example, the running surface of the inner part and the running surface of the outer part each form a contour of a circumferential surface (shell surface) of a ball ring and of a spherical zone, wherein both are arranged concentric with respect each other.

In one example, it is provided that there are slight deviations in concentricity, which are, for example, intercepted, i. e., compensated by the liner. For example, a tolerance of +/−0.5 mm is possible. For the inner part, the contour is an outwardly facing lateral surface, and for the outer part, the contour is an inwardly facing lateral surface or a negative form of a lateral surface.

Figure 2:
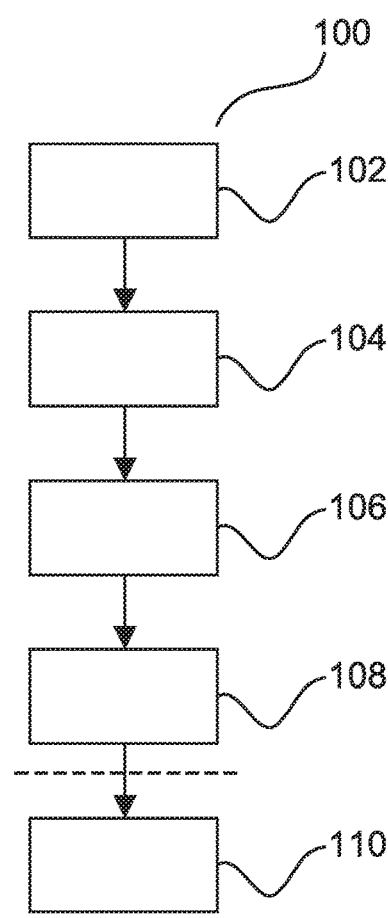
FIG. 2 an example of a method for manufacturing of a bearing.

FIG. 2 shows a method 100 for producing the bearing 10, comprising the following steps:

a) Providing 102 an outer part 12 with a concave running surface 14 which forms a receiving area 16 for receiving an inner part 18;

b) Providing 104 an inner part 18 which is arranged inside or within the outer part 12 and which is shaped annularly;

c) Arranging 106 the inner part 18 within the outer part 12 in a machining position B in which at least a part of an outer surface of the inner part 18 is exposed for machining; and d) Generating 108 a convex running surface 22 of the inner part, which engages with the receiving area 16 of the outer part 12, whereby the inner part is held captively in the outer part.

As an option is also shown:

e) Tilting 110 of the inner part 18 into a running position L, in which the inner part 18 is arranged concentrically with the outer part 12.

Figure 3:
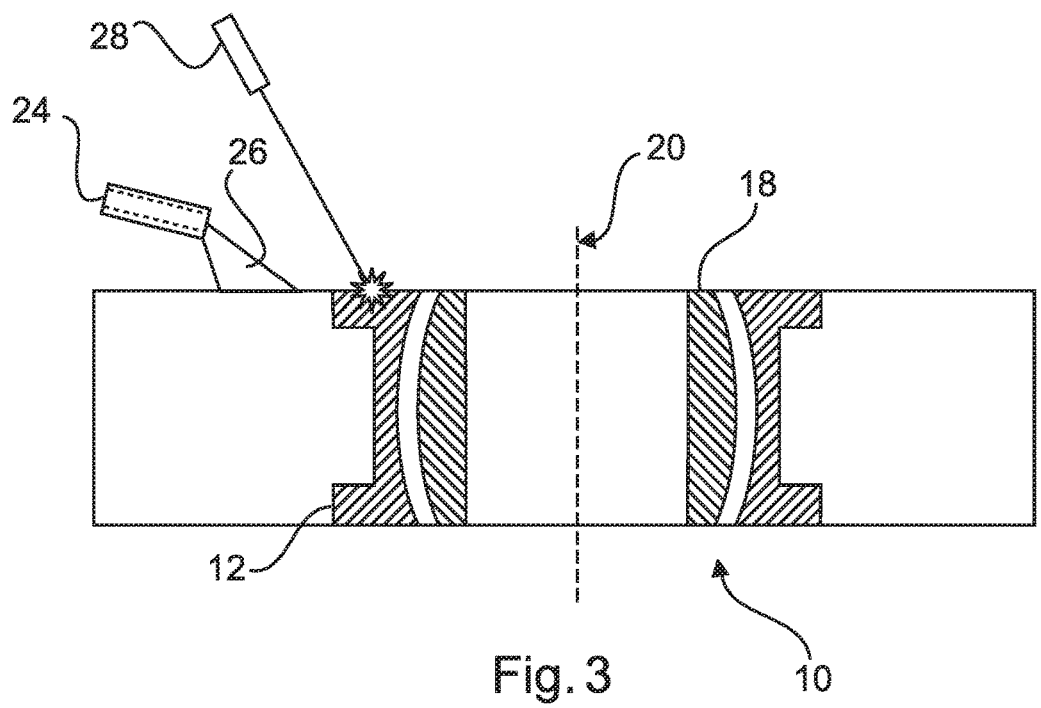
FIG. 3 an example for manufacturing of a bearing by means of a generative production process.

FIG. 3 shows by way of example the production of the bearing 10 by an additive manufacturing process. For this purpose, for example, a supply unit 24 provides metal dust 26 which is applied layerwise (layer by layer), for example. By means of a laser 28 and based on computer-internal data models, the layers are locally melted, and the bearing 10 is printed. The base material may be shapeless (e.g., the mentioned metal dust, powder, or liquid), or may be neutrally shaped (e.g., ribbon-shaped, wire-shaped). By generative manufacturing processes, the process times may be reduced and weight savings may be achieved by taking advantage of the integral construction.

The simultaneous printing of the outer part 12 and the inner part 18 also has the consequence that the inner part 18 is held captively in the outer part 12. However, the rotational degrees of freedom of the inner part 18 are not restricted, but the inner part 18 is freely rotatable. As a result, the convex running surface 22 can be rotated in such a way that it is exposed in the machining position B.

Figure 4:
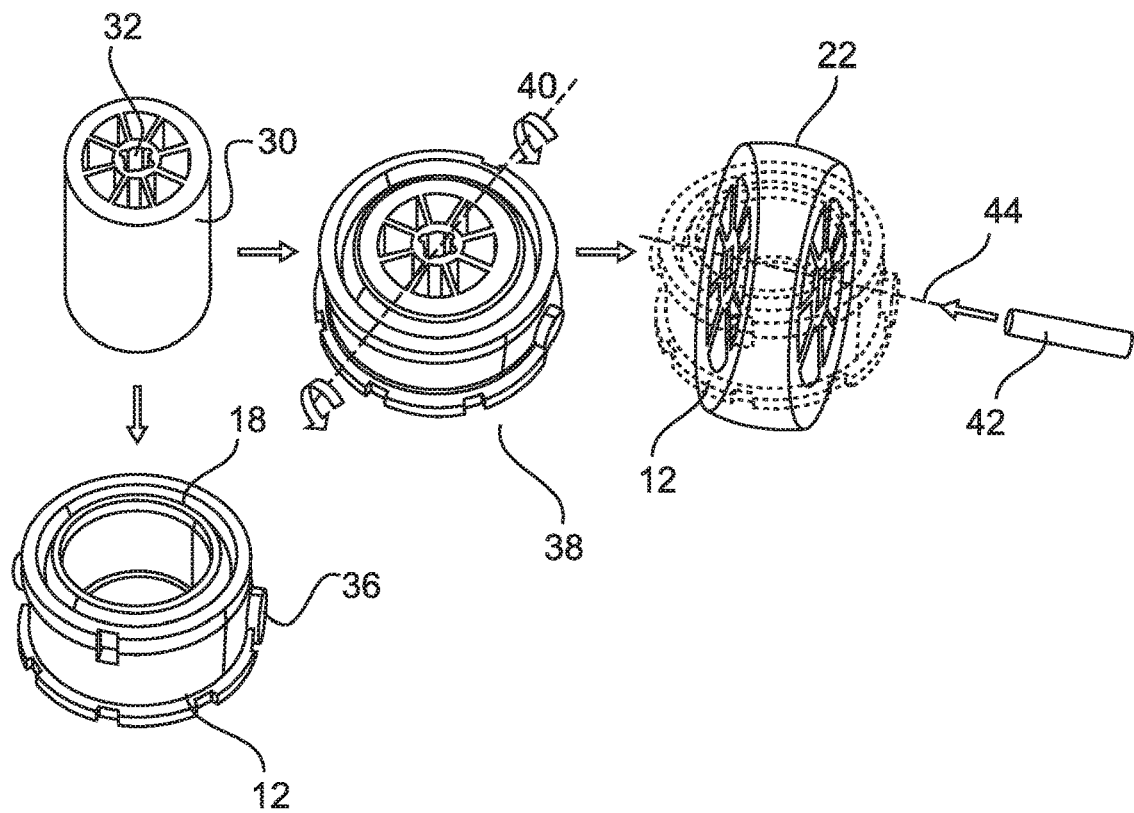
FIG. 4. a tilting of the bearing to a machining position by means of an auxiliary insert and an auxiliary tool.

FIG. 4 shows the installation of an auxiliary insert 30 in the form of an auxiliary cylinder with a receptacle 32 and the tilting of the inner part 18 into the machining position B in order to introduce an auxiliary tool 42. For this purpose, the auxiliary cylinder is introduced into an axial receiving opening 34 of the inner part 18, which is captively retained or held in the outer part 12. Furthermore, the outer part 12 has a throughway opening 36. The auxiliary cylinder together with the bearing represent a pre-assembly 38. The inner part is then rotated about a tilting axis 40 into the machining position B in which the receptacle 32 of the auxiliary cylinder and the throughway opening 36 are aligned. Subsequently, an auxiliary tool 42 is inserted into the receptacle 32 of the auxiliary insert 30 through the throughway opening 36. The inner part 18 is held rotatably on a machining axis 44 in the machining position B. In an example that is not shown, the auxiliary tool is adapted such that it is directly in contact with the inner part.

FIG. 5 shows the machining of the running surface of the inner part 18 by material removal or material abrasion. The auxiliary tool 42 is driven by an external motor unit 44 and rotates the inner part 18 thereby. The drive may, for example, take place via an auxiliary tool 42 adapted as an auxiliary axis, and alternatively or additionally via, for example, rollers, a treadmill or wheels.

In one example, the auxiliary axis is manually driven for finishing of the outer surface of the inner part.

The exposed running surface of the inner part 18 is brought to the desired surface quality, e.g., by means of an abrasion unit 46. In this case, the abrasion unit 46 comprises the possibility of performing a grinding or similar material-removing machining steps. Further, in an example that is not shown, the surface quality of the convex running surface 22 may be increased by hardening by carburizing or nitriding the inner part 18, e.g., by way of a tempering unit that is not shown in more detail.

In an example that is not shown, the finishing of the running surface comprises applying material.

FIG. 6 shows an insertion of centering rings 48a and 48b into the tapered gaps 50a and 50b between the outer part 12 and the inner part 18. As a result, the outer part 12 and the inner part 18 are held in a manner free of play. The gap 52 between the inner part 18 and the outer part 12 is thereby closed on the end face. For example, a friction-reducing bearing means 54 is inserted into the gap via the throughway opening 36. In this example, the bearing means 54 is provided in the form of a PTFE mass.

In the example shown, the friction-reducing bearing means 54 forms a dimensionally stable running surface. After forming the dimensionally stable running surface, the centering rings 50a, 50b are removed again. The centering rings 50a, 50b seal the gap 52 during formation and prevent the friction-reducing bearing means 54 from exiting during this time, until the dimensionally stable running surface 54 has formed. The term "dimensionally stable" refers to a running surface which forms a kind of coating of the running surface. The coating is tight, for example.

An example that is not shown shows an arrangement for manufacturing a bearing. This arrangement comprises a bearing as well as an auxiliary tool, wherein the auxiliary tool is preferably connectable to an auxiliary insert.

The embodiments described above may be combined in different ways. In particular, aspects of the method may be used for embodiments of the devices as well as for embodiments of use of the devices, and vice versa.

In addition, it should be noted that "comprising" does not exclude other elements or steps, and "a" or "an" does not exclude a plurality. It should also be pointed out that features or steps which have been described with reference to one of the above exemplary embodiments may also be used in combination with other features or steps of other embodiments described above. Reference signs in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a bearing, wherein the method comprises:
   a) providing an outer part with a concave running surface which forms a receiving area for receiving an inner part;
   b) providing an inner part arranged within the outer part and formed annularly;
   c) arranging the inner part within the outer part in a machining position, wherein at least a part of an outer surface of the inner part is exposed for manufacturing; and
   d) generating a convex running surface of the inner part, which running surface engages with the receiving area of the outer part, whereby the inner part is held captively in the outer part;
   wherein the inner part is tiltable from the machining position into a running position (L) in which the inner part is arranged concentrically with the outer part.

2. The method according to claim 1, further comprising:
   e) tilting of the inner part into a running position in which the inner part is arranged concentrically with the outer part.

3. The method according to claim 1,
   wherein the outer part and the inner part are being produced generatively, and a convex outer surface of the inner part at least partly engages with the concave receiving area of the outer part, and the inner part is thereby retained captively; and
   wherein the production of the outer part with the inner part preferably takes place simultaneously.

4. The method according to claim 1,
   wherein the outer part comprises at least one throughway opening in the concave running surface and the inner part comprises an axial receiving opening;
   wherein, for step d), the at least one throughway opening and the receiving opening are aligned, and an auxiliary tool is inserted into the receiving opening through the throughway opening, so that the inner part is rotatably held in the machining position;
   wherein the inner part is preferably rotatably moved via the auxiliary tool in step d).

5. The method according to claim 4, wherein an auxiliary insert with a receptacle is inserted into the receiving opening before the insertion of the auxiliary tool, and the auxiliary tool is inserted into the receptacle in order to keep the inner part rotating.

6. The method according to claim 1, wherein the inner part is driven by an external motor unit for finishing of the outer surface.

7. The method according to claim 1, wherein finishing of the convex running surface comprises a material removal.

8. The method according to claim 1, wherein two centering rings are inserted into a tapering gap between the outer part and the inner part to keep the inner part and the outer part movable free of play and to close off a gap between the inner part and outer ring on the end face.

9. The method according to claim 8,
wherein the gap between the inner part and the outer ring is filled with a friction-reducing bearing means after the positioning of the centering rings;
wherein, preferably, a dimensionally stable running surface is formed with the friction-reducing bearing means; and
wherein, more preferably, the centering rings are removed after forming the dimensionally stable running surface.

10. The method according to claim 1,
wherein the running surface of the inner part and the running surface of the outer part each has a contour of a shell surface of a ball ring and form a spherical zone; and
wherein both are aligned concentric with respect to each other.

* * * * *